United States Patent [19]
Mahlich et al.

[11] Patent Number: 4,893,422
[45] Date of Patent: Jan. 16, 1990

[54] STEAM IRON WITH WATER SOFTENING FACILITY

[75] Inventors: Gotthard C. Mahlich, Kronberg; Michael Borgmann, Solingen, both of Fed. Rep. of Germany

[73] Assignee: Robert Krups Stiftung & Co. KG., Solingen, Fed. Rep. of Germany

[21] Appl. No.: 239,211

[22] Filed: Aug. 31, 1988

[30] Foreign Application Priority Data

Sep. 5, 1987 [DE] Fed. Rep. of Germany ....... 3729800

[51] Int. Cl.⁴ .............................................. D06F 75/14
[52] U.S. Cl. .................................... 38/77.3; 38/77.83; 38/77.8; 210/94; 210/251; 210/282
[58] Field of Search ............. 68/13 A; 38/77.6, 77.83, 38/77.2, 77.3, 77.8; 210/282, 94, 251

[56] References Cited

U.S. PATENT DOCUMENTS

| | | | |
|---|---|---|---|
| 2,749,307 | 6/1956 | Ellison | 210/94 |
| 2,869,724 | 1/1959 | McDevitt | 210/94 |
| 3,722,117 | 3/1973 | Davidson | 38/77.83 |
| 4,565,019 | 1/1986 | Cavalli | 38/77.6 |

FOREIGN PATENT DOCUMENTS

| | | | |
|---|---|---|---|
| 2351245 | 4/1975 | Fed. Rep. of Germany | 210/282 |
| 2650837 | 11/1977 | Fed. Rep. of Germany | 38/77.8 |
| 735606 | 8/1955 | United Kingdom | 210/282 |

Primary Examiner—Andrew M. Falik
Attorney, Agent, or Firm—Peter K. Kontler

[57] ABSTRACT

An electric steam iron wherein the path for the flow of water from a permanently installed or detachable water tank to the heater contains a supply of water softening agent which can be observed from the exterior of the housing and can be replaced, when necessary, or discarded jointly with an expandible tank or with a perforable envelope or an apertured cartridge.

35 Claims, 4 Drawing Sheets

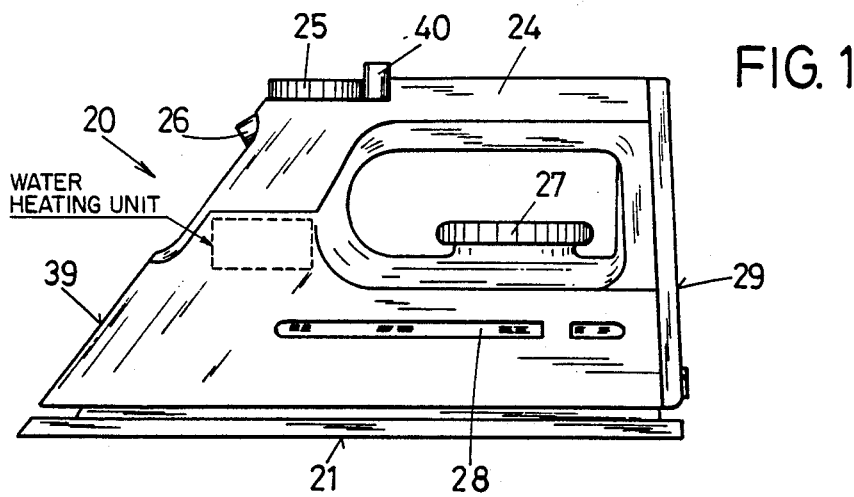
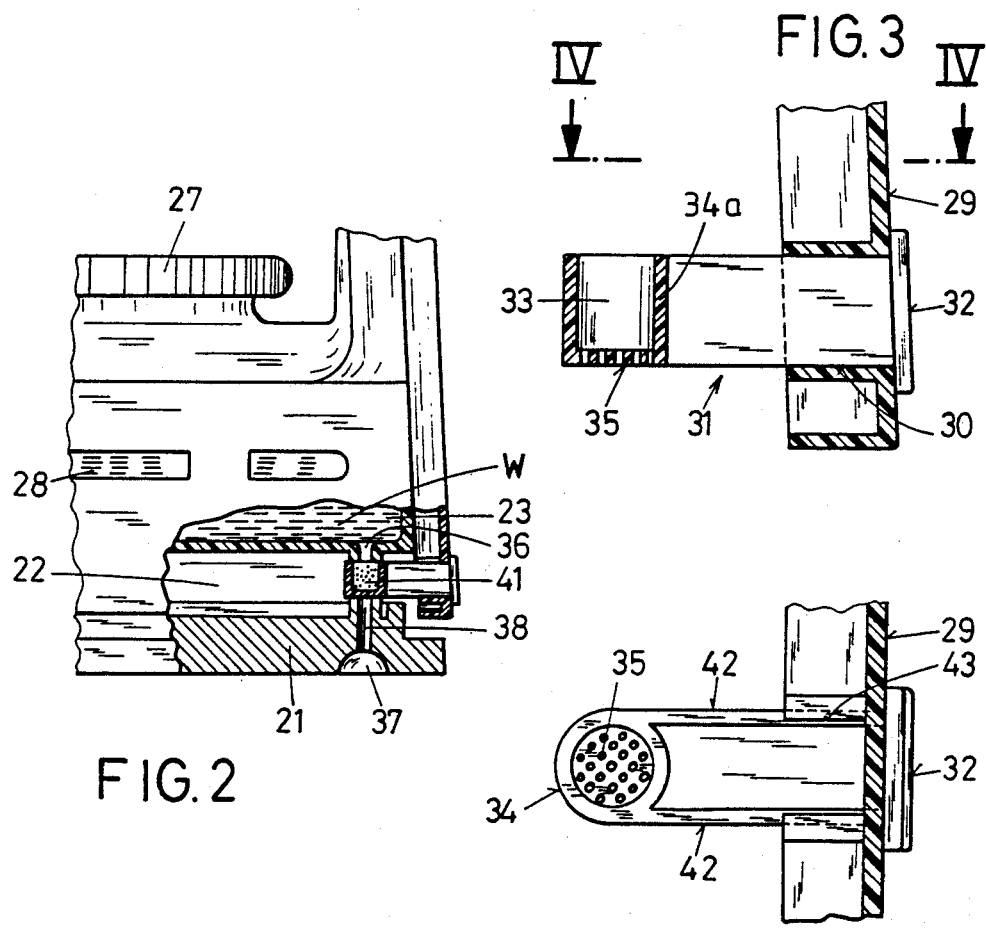

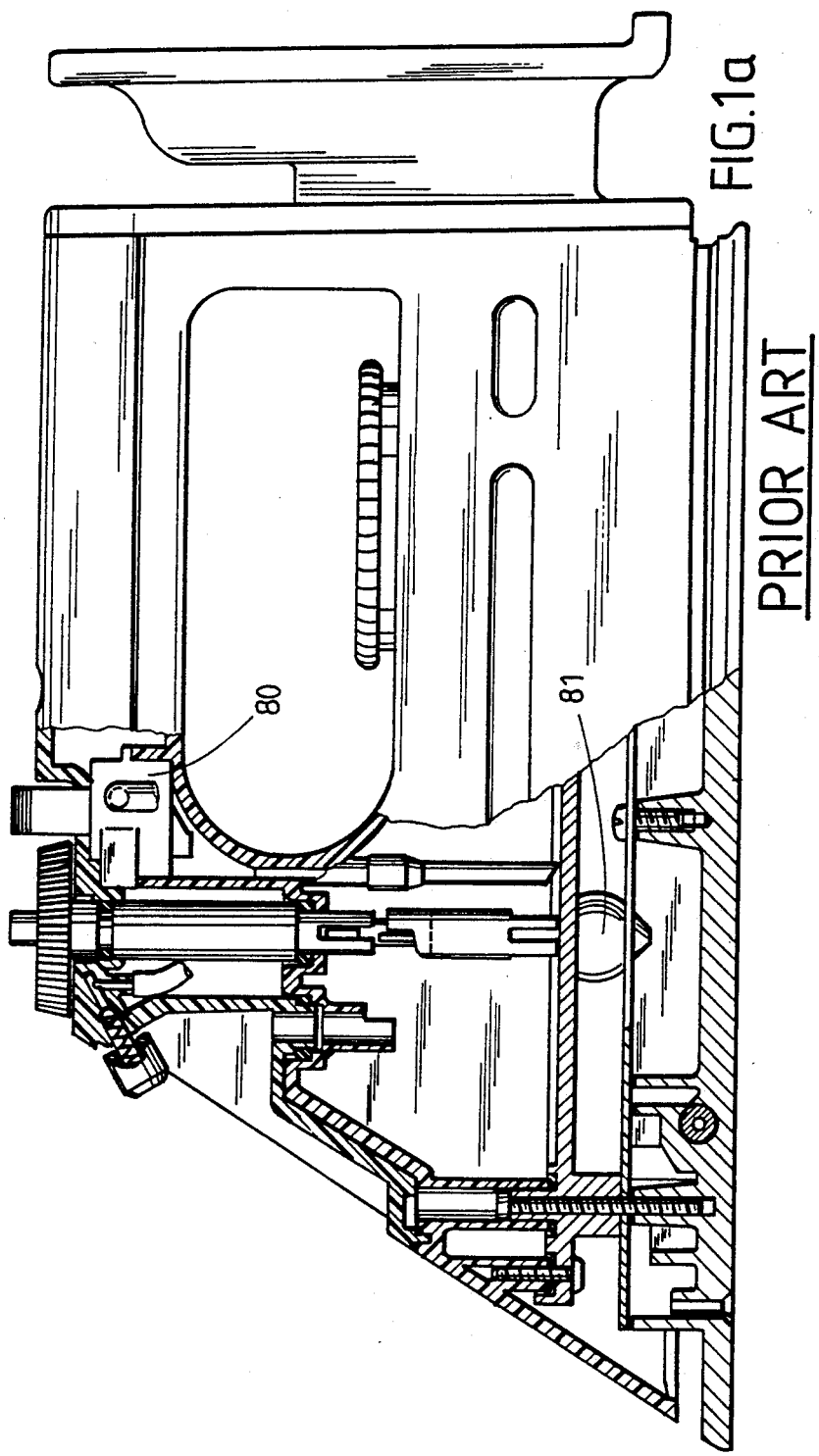

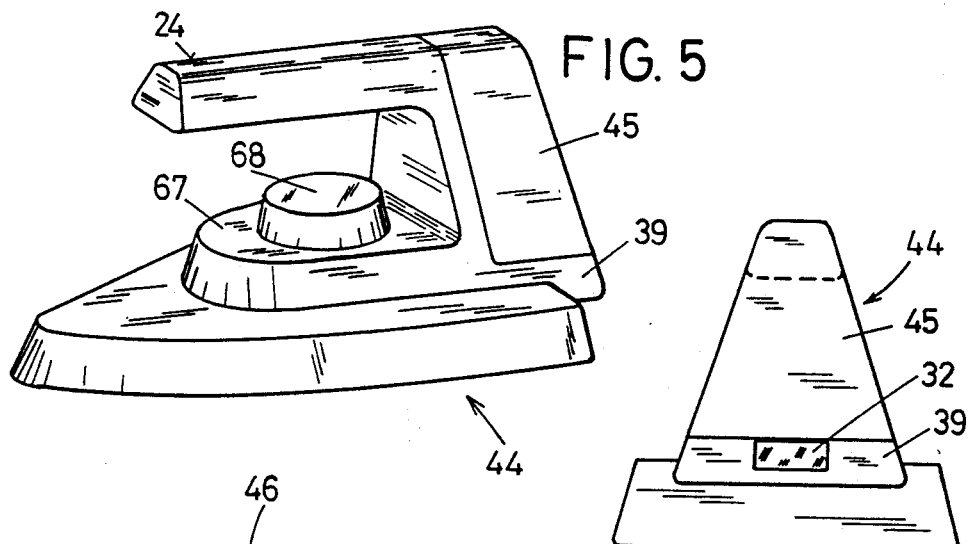
FIG. 5
FIG. 6
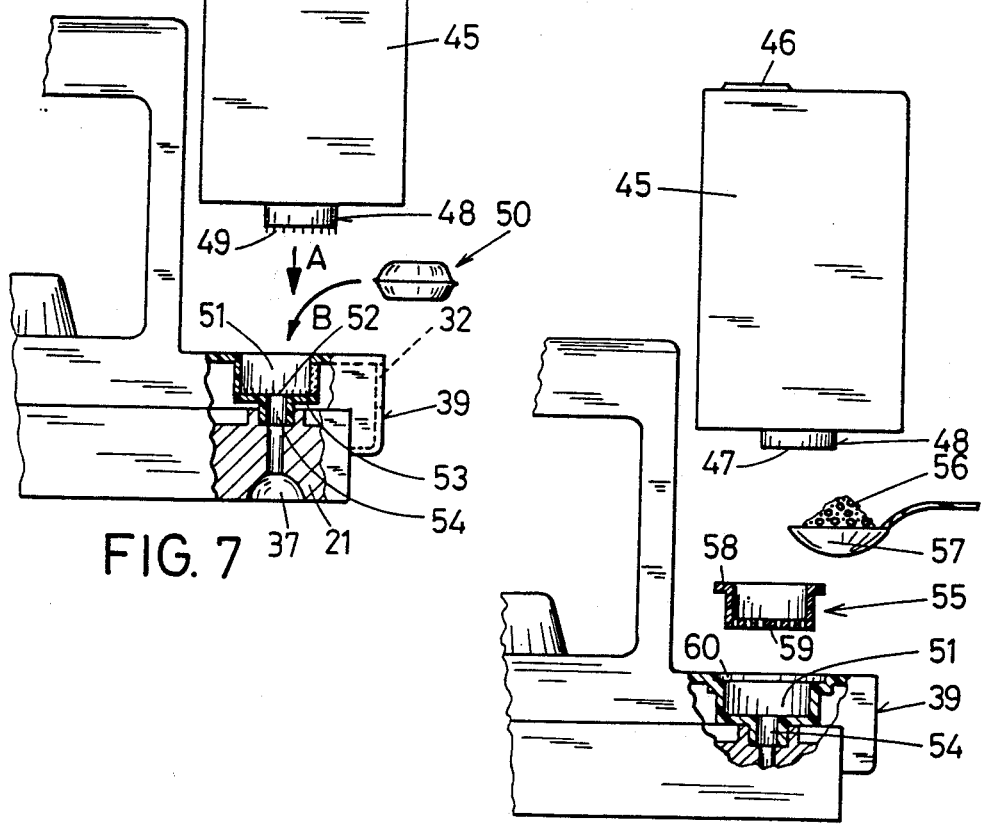
FIG. 7
FIG. 8

STEAM IRON WITH WATER SOFTENING FACILITY

BACKGROUND OF THE INVENTION

The invention relates to appliances in general, and more particularly to electric appliances which consume water while in use. Typical examples of such appliances are steam irons, coffee, espresso and capuccino making machines and tea making machines. For the sake of simplicity and convenience, the invention will be described with reference to electric steam irons; however, it is to be understood that the invention can be embodied with similar or equal advantage in many other types of water-consuming appliances.

An electric steam iron normally comprises a housing which is provided with or carries an apertured sole plate and has a handle as well as a vessel for a supply of water. A steam chamber is provided in the housing to receive and confine steam which develops as a result of heating water to the boiling point and to supply steam to the apertures of the sole plate. The steam iron can be further provided with means for regulating the heating action and with means for regulating the rate of flow of water from the vessel into the range of the electric heating element or elements. As a rule, the vessel is filled with tap water which normally contains various gases as well as salts which are drawn from the soil or from the rocks with which the water comes in contact prior to entering a reservoir serving as a source of water for the taps in a dwelling or in another establishment. Salts which are customarily found in tap water include sodium bicarbonate, sodium sulfate and magnesium bicarbonate. The percentage of sodium and magnesium salts determines the hardness of water which is normally measured in degrees, such as the English or Clark degrees, the French degrees and the German degrees. The number of degrees is higher if the water is harder, and vice versa.

Hardness of water which is used in a steam iron exerts a great influence upon the useful life of the appliance. The reason is that heating entails a decomposition of water into its constituents, and such constituents, especially carbonates, deposit on the adjacent surfaces in the form of scale. The scale is an insulator of heat so that the energy requirements of the steam iron increase as the thickness of scale increases. In addition, scale gradually clogs various pipes, conduits and other components which define relatively narrow paths for the flow of water in the interior of a steam iron.

Heretofore known proposals to eliminate scale include the utilization of various acids. Thus, if the scale gathers on parts which are made of copper, brass or certain other metals, it can be removed with diluted lactic or acetic acid. The makers of steam irons recommend periodic descaling of such appliances; the length of intervals between successive descaling operations depends upon the hardness of water which is used in the steam irons.

It is further known to employ so-called decalcification or softness indicators in the form of electric or electronic instruments which contribute significantly to complexity and cost of the appliances. Moreover, presently known instruments of such character are not overly reliable which is another reason why they failed to gain widespread acceptance in the relevant industry.

OBJECTS OF THE INVENTION

An object of the invention is to provide a water-consuming appliance with novel and improved means for preventing the deposition of scale in or on components which are likely to be adversely affected by scale or wherein deposits of scale are likely to adversely affect the operation, the energy requirements and/or the useful life of the entire appliance.

Another object of the invention is to provide an appliance wherein only the vessel for fresh water is apt to gather scale but all other parts which come in contact with water are reliably insulated from scale and/or from constituents which are likely to cause the deposition of scale.

A further object of the invention is to provide a novel and improved steam iron wherein the parts which could be adversely affected by boiler scale are contacted solely by soft water.

An additional object of the invention is to provide a novel and improved method of softening water in electric appliances.

Still another object of the invention is to provide an appliance wherein the intensity of softening of tap water can be monitored in a simple and time-saving manner without necessitating even partial dismantling of the appliance and wherein the intensity of softening can be enhanced whenever and as often as necessary.

A further object of the invention is to provide a novel and improved vessel for storage of water in water-consuming electric appliances.

Another object of the invention is to provide a novel and improved housing for steam irons and other types of water-consuming appliances.

An additional object of the invention is to provide a simple and inexpensive method of preventing deposition of scale in conduits, pipes and analogous water conveying parts of a steam iron or another water-consuming appliance.

A further object of the invention is to provide prefabricated inserts which consist of or which contain one or more softening agents and can be used in appliances of the above outlined character.

Another object of the invention is to provide novel and improved disposable water tanks for use in water-consuming appliances.

SUMMARY OF THE INVENTION

The invention is embodied in an electric appliance, such as a steam iron, a coffee maker or a tea making machine. The appliance comprises a vessel which serves to store a body of water, such as magnesium- and/or calcium-containing tap water, means for receiving water from the vessel (such receiving means can include a steam chamber or a filter holder for tea leaves of comminuted coffee beans), means defining at least one path for the flow of water from the vessel to the receiving means, and a supply of declacifying or softening agent in such path. The term "declacifying or softening agent" is intended to embrace all types of substances which are used to soften water by removing scale-forming calcium and/or magnesium ions from hard water or replacing them by the more soluble ions, such as sodium ions.

The improved appliance preferably further comprises an observation facility for the supply of softening agent in the aforementioned path. As a rule, or at least in many instances, the composition of the softening agent which is used in the supply is such that at least one of its characteristics (particularly its color) changes when its softening capacity is reduced or exhausted. The observation facility is then designed to permit visual determination of the one characteristic of the softening agent. For example, the observation facility can include a window which permits an inspection of the supply of softening agent through the rear end wall of an electric steam iron if the invention is embodied in a steam iron.

If the appliance is a steam iron, it further comprises a housing having an apertured sole plate, and the receiving means of such appliance normally includes one or more electric resistance heaters or other suitable means for heating water to the boiling point with attendant generation of steam, and a steam chamber which serves to admit steam to the apertures of the sole plate.

In accordance with one presently preferred embodiment of the invention, the path defining means includes at least one water outlet which is provided in or on the vessel, and a receptacle which serves to confine the supply of softening agent and receives water from the outlet. If the appliance is a steam iron, the receiving means comprises a steam chamber and the receptacle includes a liquid-permeable portion through which water passes on its way into the steam chamber subsequent to penetration through the supply of softening agent. The outlet is normally disposed at a level above the receptacle and the latter then includes a bottom wall which is disposed beneath the supply of softening agent and includes the liquid permeable portion. The observation facility is then designed and mounted with a view to permit observation of softening agent in the receptacle To this end, at least a portion of the receptacle transmits light and such light-transmitting portion is disposed between the supply of softening agent and the observation facility. The aforementioned housing of the appliance confines the path defining means, and the appliance can further comprise a support (e.g., a reciprocable slide) for the receptacle. The support is movably mounted in the housing and the observation facility can be provided on the support. For example, the housing of a steam iron can include an end wall (such as the rear end wall) and the support can be movably mounted in the end wall so that the observation facility is disposed externally of the housing. The support is or can be elongated; the receptacle is then provided at one end and the observation facility at the other end of such elongated support. The end wall is provided with an opening for the support and with guide means adjacent the opening to confine the support to reciprocatory movements relative to the housing. The support and the housing can be provided with cooperating male and female detent means for releasably holding the support in at least one predetermined position with reference to the end wall, e.g., in that position in which the receptacle is in line with the outlet of the vessel so that it is contacted by outflowing water.

The receiving means can comprise a water metering device, such as a pump or a valve. If the appliance is a steam iron, the steam chamber receives water from the metering device.

The novel features which are considered as characteristic of the invention are set forth in particular in the appended claims. The improved appliance itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic side elevational view of a steam iron wherein the water vessel is incorporated into the housing and the supply of softening agent is insertable into and extractible from the housing outside of the water vessel;

FIG. 1a is a partly elevational and partly vertical sectional view of a steam iron which is provided with a pump and a valve of the type capable of being used in the steam iron of FIG. 1;

FIG. 2 is an enlarged rear elevational view of the steam iron of FIG. 1, with portions of the housing, water vessel, sole plate and path defining means shown in partial section;

FIG. 3 is an enlarged view of a detail in the structure of FIG. 2, showing the rear end wall of the housing, the receptacle for the supply of softening agent, the observation facility and the support for the receptacle and observation facility;

FIG. 4 is a view as seen in the direction of arrow IV—IV in FIG. 3;

FIG. 5 is a schematic perspective view of a modified steam iron wherein the water vessel constitutes a tank which is separably coupled to the rear portion of the housing;

FIG. 6 is a rear elevational view of the steam iron which is shown in FIG. 5;

FIG. 7 is a fragmentary exploded partly sectional view of the rear portion of the steam iron of FIG. 5;

FIG. 8 is a similar fragmentary exploded partly sectional view of a third steam iron which constitutes a modification of the steam iron shown in FIGS. 5 to 7;

DESCRIPTION OF PREFERRED EMBODIMENTS

Figure 9:
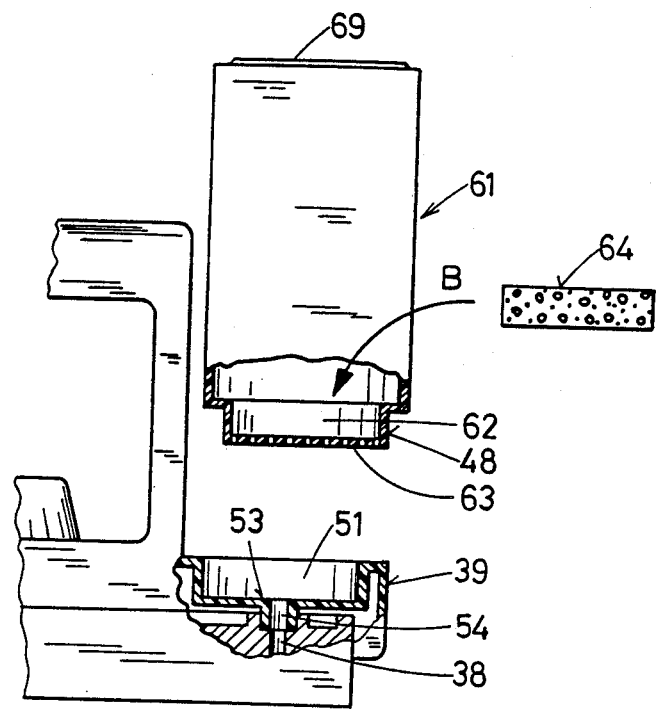
FIG. 9 is a similar fragmentary exploded partly sectional view of a fourth steam iron which constitutes a further modification of the steam iron of FIGS. 5 to 7 and employs an expendable water tank.

Referring first to FIGS. 1 to 4, there is shown a water-consuming appliance 20 which constitutes an electric steam iron. FIGS. 1-4 show only those parts of the steam iron which are necessary for full understanding of the invention. Thus, the drawing does not show all details of the temperature-adjusting and steam flow-regulating components of the steam iron, the electric cable which connects the heating unit to a source of electrical energy, various conductors in the housing 39 of the steam iron, as well as all conduits and/or pipes which convey water from a built-in water-storing vessel 23 to a steam chamber 22 and thence into the apertures 37 (only one shown) in the sole plate 21 of the housing 39.

All such parts which are not shown in FIGS. 1-4 but are necessary for proper operation of a steam iron can be constructed and assembled in a manner as known from conventional steam irons, for example, the steam iron known as "CareTex" adjustable steam/spray/dry iron No. 633 or "SoftTex" adjustable steam/spray,dry iron No. 636, both manufactured and distributed by the assignee of the present application.

The housing 39 of the steam iron 20 which is shown in FIGS. 1-4 is assembled of several parts in a manner which is not specifically shown in the drawing. The sole plate 21 can constitute an integral or a detachable part of the housing 39 which is contained in the steam iron. As mentioned above, the sole plate 21 is provided with a plurality of apertures 37 which extend to the workpiece smoothing surface of the soleplate and can discharge steam into fabric when the steam iron 20 is in actual use. The number and/or distribution of apertures 37 depends on the size and on intended use of the steam iron. For example, the apertures 37 can be distributed in a manner to yield focused steam flow as is known from the aforementioned "CareTex" iron No. 633 which is distributed by the assignee of the present application.

The housing 39 further comprises a handle 24 disposed at a level above an adjusting wheel 27 which can be rotated in order to change the heating action of the water heating unit in the housing 39. A knob 25 on the handle 24 can be rotated in order to regulate the rate of discharge of steam from the chamber 22. Furthermore, the handle 24 supports a depressible knob 40 which controls the flow of atomized water from a nozzle 26 serving to direct a water spray onto the fabric in front of the leading portion of the sole plate 21 when the steam iron 20 is in actual use. The operative connection between the knob 40 and the nozzle 26 is well known and is not illustrated in the drawing. The same applies for the operative connection between the knob 25 and the means for admitting steam into the apertures 37 of the sole plate 21 as well as for means for establishing an electrical connection between the adjusting wheel 27 and the electric heater in the housing 39.

The housing 39 is further provided with a water level indicator 28 of conventional design which enables the user of the steam iron 20 to ascertain the quantity of water W in the vessel 23 in the interior of the housing 39. The steam chamber 22 in the housing 39 is disposed immediately or closely above the sole plate 21 and is of conventional design. The chamber 22 serves to accumulate and store steam which is obtained by heating water W to the boiling point in response to appropriate manipulation of the adjusting wheel 27 beneath the handle 24.

The lower portion of the vessel 23 in the housing 39 has an outlet 36 which can discharge water W by gravity flow. Such outlet is adjacent the rear end wall 29 of the housing 39. The outlet 36 constitutes one component of a means which defines a path for the flow of water W from the vessel 23 into one or more water receiving components of the steam iron. One of these components is the steam chamber 22 and another such component can include the aforementioned heating unit the heating action of which is regulatable by the adjusting wheel 27 so as to intensify or weaken the water heating action and hence the rate of steam generation. The path defining means further comprises a receptacle 34 which is provided at the inner end of an elongated reciprocable slide-like support 31 and defines a chamber or compartment 33 for a supply 41 of granular or powdery water softening agent. The path defining means further comprises one or more channels 38 which serve to supply steam to the respective apertures 37 in the sole plate 21 of the housing 39.

The support 31 is reciprocable in an opening 30 which is provided therefor in the rear end wall 29 of the housing 39. The outer end portion of the support 31 carries an observation facility in the form of a window 32. The window 32 permits observation of the color and/or other characteristics of the supply 41 of water softening agent in the compartment 33 of the receptacle 34 at the inner end of the support 31. The portion 34a of the receptacle 34 transmits light so that a person looking through the window 32 can see the color of the supply 41 of softening agent in the compartment 33. Certain softening agents which can be utilized in the steam iron 20 of FIGS. 1 to 4 are of such composition that their color changes when their water softening action decreases so that, by observing the color of the softening agent in the compartment 33, the operator can ascertain whether or not the supply 41 is still capable of performing its intended water softening function. If not, the support 31 is simply withdrawn from the opening 30 in the rear end wall 29 of the housing 39, the supply 41 of softening agent is expelled from the compartment 33, and such compartment is filled with a fresh supply 41 of softening agent prior to reinsertion of the support 31 into the opening 30 of the rear end wall 29. The rear end wall 29 is provided with guide means 43 which flank the opening 30 and cooperate with complementary follower means 42 on the support 31 to ensure that the support is properly guided during movement relative to the housing 39. FIGS. 2-4 show the support 31 in one of its positions, namely in that predetermined position in which the receptacle 34 is located in the aforementioned path for the flow of water W from the outlet 36 of the vessel 23 into the water receiving means of the steam iron 20. The bottom wall 35 of the receptacle 34 constitutes a water-permeable portion which permits water W to flow through the supply 41 of softeninq agent toward and into the water receiving means of the steam iron 20. For example, the bottom wall 35 can constitute a conventional sieve or filter with interstices which are small enough to retain the supply 41 of softening agent but permit water to flow therethrough toward and ultimately into the steam chamber 22 prior to entering the apertures 37 of the sole plate 21.

The support 31 can constitute a single piece of plastic material which transmits light so that its outermost portion constitutes the observation facility or window 32 and its innermost portion constitutes the receptacle 34. Suitable detent means can be provided on the support 31 and/or on the rear end wall 29 of the housing 39 to releasably hold the support in one or more predetermined positions, for example, in the position which is shown in FIGS. 2-4 and in which the receptacle 34 constitutes one element of the path defining means for the flow of water W from the vessel 23 toward and into the apertures 37 of the sole plate 21.

The supply 41 of softening agent can constitute a loose granular or powdery substance. Alternatively, the supply 41 can constitute a cartridge which contains compacted or compressed softening agent and has a shape such as to conform, at least substantially, to the configuration of the compartment 33 in the receptacle 34. Thus, when the color of the supply 41 of softening agent in the compartment 33 changes to indicate that the supply 41 is incapable of performing its intended water-softening function, the support 31 is extracted from the rear end wall 29 of the housing 39, the cartridge is expelled from the compartment 33, and such compartment is then ready to receive a fresh cartridge which is capable of softening water W that flows into and beyond the outlet 36 of the vessel 23.

The guide means 43 in the end wall 29 of the housing 39 can constitute grooved portions provided in the rear end wall and serving to receive the elongated stripshaped followers 42 of the support 31. Alternatively, the followers 42 of the support 31 can be provided with grooves which receive ribs forming part of the rear end wall 29. The aforementioned detent means can comprise one or more protuberances on the one and/or the other follower 42 of the support 31 and one or more complementary recesses or notches in the rear end wall 29. A projection can snap into the adjacent recess to thereby hold the support 31 in a selected position relative to the housing 39. When necessary, the operator exerts a force which suffices to deform the followers 42 of the support 31 so as to expel the protuberances from the respective recesses or notches and to thus permit the support 31 to slide relative to the rear end wall 29 to another position or to be extracted from the housing 39 for the purpose of inspecting and/or replenishing the supply 41 of water softening agent in the compartment 33 of the receptacle 34.

The supply 41 can contain a water softening agent of known composition. Such agents are available on the market. Any suitable chemical can be used in the compartment 33 as long as it is capable of softening water W which enters the receptacle 34 by flowing through the outlet 36 of the vessel 23 on its way into the water-receiving component or components or the steam iron 20.

As mentioned above, the steam iron 20 can further comprise one or more water metering devices in the form of pumps, drip valves or the like. Such metering devices are desirable and advantageous in order to ensure that the quantity of water which is permitted to flow into the range of the electric heating unit or units can be regulated with a desired degree of accuracy to thereby control the rate of steam generation. The metering device or devices receive softened water so that their passage or passages are not clogged as a result of deposition of scale. The conduit 38 which is shown in FIG. 2 is intended to symbolically represent a metering device which regulates the rate of flow of softened water directly or indirectly into the steam chamber 22 and/or into other water receiving components of the steam iron 20. FIG. 1a is a partly elevational and partly vertical sectional view of a steam iron which is disclosed in the commonly owned published German patent application Ser. No. 34 35 654 of Marchiselli and wherein a pump and a drip valve are respectively shown at 80 and 81. Such components can be used in the steam iron of FIG. 1.

An important advantage of the steam iron 20 is that the supply 41 of softening agent is placed immediately adjacent the outlet 36 of the vessel 23 so that the water is softened as soon as it leaves the vessel and scale cannot accumulate on any water receiving parts which come in contact with water downstream of the outlet 36. This contributes to longer useful life of the steam iron.

Another important advantage of the steam iron 20 is that the operator can observe the condition of the supply 41 of softening agent so that such supply can be replaced with a fresh supply whenever necessary, especially when the coloration of the supply 41 is indicative that its effectiveness as a water softening agent has been reduced sufficiently to warrant replenishment or replacement.

The guide means 43 on the rear wall 29 and the complementary followers 42 on the support 31 ensure that the support is confined to movements between preselected positions relative to the housing 39 of the steam iron 20. The aforementioned detent means are an optional but desirable feature of the steam iron. The male detent means can be provided on the followers 42 and the complementary female detent means can be provided on the rear end wall 29, or vice versa.

The compartment 33 of the receptacle 34 can receive specially designed cartridges of softening agent, or it can be dimensioned in such a way that it can accommodate commercially available refills which contain or consist of a suitable water softening agent.

It goes without saying that the housing 39 of the steam iron 20 which is shown in FIGS. 1 to 4 is provided with a suitable inlet for admission of fresh water into the vessel 23. Such inlet can be sealed by a closure in the form of a plug, lid, bung or the like.

FIGS. 5, 6 and 7 illustrate a modified steam iron 44 wherein all such parts which are identical with or clearly analogous to corresponding parts of the steam iron 20 of FIGS. 1–4 are denoted by similar reference characters. The housing 39 of the steam iron 44 comprises a modified handle 24 and supports a detachable vessel 45 which constitutes a refillable water tank. The handle 24 is not provided with the knobs 25, 40 and/or with the nozzle 26 of FIG. 1. The front end portion of the handle 24 is free, i.e., it is not connected with the adjacent major portion of the housing 39.

An advantage of a detachable water tank 45 is that it can be readily separated from the housing 39 for transfer to a faucet so as to be filled with a fresh body of tap water upon removal or opening of a closure or lid 46 at the top of the tank 45. The illustrated water tank 45 is separably connected, or is separably connectable, to the rear portion of the housing 39, namely to the portion behind the modified handle 24. The rear portion of the housing 39 is provided with a female (second) coupling element 51 which can separably receive and frictionally retain a complementary male coupling element 48 at the bottom of the water tank 45. The coupling element 48 constitutes or includes one or more outlets for the flow of tap water from the interior of the tank 45 into a space 54 forming part of the path for the flow of water (subsequent to softening) to one or more water receiving components in the housing 39. The female coupling element 51 further constitutes a means for receiving a puncturable cartridge or envelope 50 which contains a supply of water softening agent and is sealed from the surrounding atmosphere when the coupling element 48 is properly introduced into the female coupling element 51. The coupling element 48 is provided with one or more downwardly extending needles, sharp pins or analogous puncturing elements 49 which make openings or holes in the adjacent portion of the envelope 50 within the female coupling element 51 of the housing 39 in response to insertion of the coupling element 49 into the coupling element 51. Furthermore, the bottom wall 53 of the female coupling element 51 can be provided with additional needle- or pin-like puncturing elements 52 which puncture the bottom panel of the properly inserted envelope or cartridge 50 so as to provide a plurality of paths for the flow of softened water from the interior of the envelope 50 into the space 54. If desired, the coupling elements 48, 51 can be provided with suitable male and female detent means (not shown) which enhance the reliability of separable connection between the water tank 45 and the housing 39 of the steam iron 44. The direction in which the water tank 45 is to be moved in order to introduce the coupling element 48 into the complementary female coupling element 51 is indicated in FIG. 7 by the arrow A. The envelope 50 constitutes a disposable part of the improved steam iron 44 which latter can be supplied with a number of such envelopes at the time of purchase. One of numerous directions in which the envelope 50 can be inserted into the female coupling element 51 of the housing 39 is indicated in FIG. 7 by the arrow B. The envelope 50 can be made of a thin metallic or plastic foil, paper or textile material. All that counts is to ensure that the envelope 50 can be punctured by the elements 59 and/or 52 in order to ensure that hard water can penetrate into contact with the confined supply of softening agent and that softened water can enter the space 54 beneath the bottom wall 53 of the female coupling element 51 in the housing 39. While it is possible to employ an envelope 50 which is permeable to liquids, it is normally preferred to confine the supply of water softening agent in an envelope which is not permeable to liquids so as to ensure that the supply of water softening agent is properly sealed from the surrounding atmosphere prior to introduction into the female coupling element 51 and subsequent introduction of the male coupling element 48 into the upper portion of the female coupling element 51. It is preferred to employ a relatively large number of puncturing elements 49 and 52 so as to ensure that water which requires softening can readily penetrate into the properly inserted envelope 50 as well as that treated water can readily flow from the lower portion of the envelope 50 on its way into the space 54 beneath the bottom wall 53 of the female coupling element 51.

The closure 46 at the top of the water tank 45 can be threadedly or otherwise connected with the topmost portion of the tank, as long as it can be moved to a position in which it permits fresh tap water to flow into the tank 45 to be thereupon movable back to a position in which it at least substantially seals the interior of the tank 45 from the surrounding atmosphere.

FIG. 6 shows that the rear end wall of the housing 39 is provided with an observation facility 32 in the form of a window which permits observation of the envelope 50 in the female coupling element 51. To this end, at least the rearmost portion of the coupling element 51 and at least a portion of the envelope 50 can be made of or contain a light transmitting material so that the person using the steam iron 44 can observe the color of the supply of softening agent in the envelope 50. If the color is unsatisfactory, i.e., if the user ascertains that the supply of softening agent in the envelope 50 is exhausted or is incapable of performing its intended water softening function, the tank 45 is detached from the housing 39, and the envelope 50 is replaced with a fresh envelope which can be inserted in the direction of the arrow B.

FIG. 5 shows that the central portion 67 of the housing 39 beneath the handle 24 carries an adjusting wheel 68 which can be rotated in order to regulate the action of the heating element or elements for softened water and hence the generation of steam which is discharged through the apertures 37 of the sole plate 21.

FIG. 8 shows a steam iron which constitutes a modification of the steam iron 44 of FIGS. 5-7. The main difference is that the envelope 50 is replaced with a refillable receptacle 55 which can be introduced into the female coupling element 51 of the housing 39. The receptacle 55 has a perforated bottom wall 59 and an open top surrounded by a ring-shaped rim 58 receivable in a complementary recess 60 in the top portion of the female coupling element 51. The puncturing elements 49 and 52 of FIG. 7 are omitted because the supply 56 of water softening agent (which can be admitted in metered quantities by a spoon 57 or the like) is not confined in a puncturable material but is poured directly through the open top of the receptacle 55 so that it comes to rest on the bottom wall 59. When the male coupling element 48 of the detachable water tank 45 is inserted into the properly inserted receptacle 55 in the female coupling element 51, the receptacle 55 is frictionally held in the coupling element 51 and the coupling element 48 is frictionally held in the receptacle 55 so as to ensure that the tank 45 cannot be accidentally detached from the housing 39. The reference character 47 denotes the outlet in the bottom portion of the male coupling element 48. The tank 45 can be refilled with tap water while it remains attached to the housing 39 or subsequent to detachment from such housing. The top wall of the tank 45 again carries a closure or lid 46 which can be lifted or removed in order to permit refilling of the tank with a fresh body of water. The supply 56 of water softening agent can be admitted into the receptacle 55 in granular and/or powdery form, as long as it is incapable of penetrating through the bottom wall 59 of the receptacle and entering the space 54 in the downwardly extending central portion or spout of the bottom wall of the female coupling element 51.

The dimensions of the recess 60 in the female coupling element 51 are preferably selected in such a way that the upper side of the properly inserted receptacle 55 is flush with the upper side of the female coupling element 51. This ensures that the underside of the water tank 55 can come into full surface-to-surface contact with the adjacent portion of the housing 39 when the tank 45 is properly coupled to the housing.

The purpose of the receptacle 55 is to facilitate complete evacuation of spent (discolored) softening agent from the female coupling element 51. However, it is equally within the purview of the invention to pour a suitable softening agent, or to introduce a cartridge of compacted softening agent, directly into the interior of the female coupling element 51. The construction which is shown in FIG. 8 is preferred at this time because it simplifies the evacuation of spent water softening agent and prevents such agent from penetrating into the space 54 and deeper into the interior of the housing 39. As a rule, the softening agent 56 which is used in the steam iron of FIG. 8 will be in granular form. The receptacle 55 can be removed by hand or by resorting to a rudimentary tool. Such receptacle is preferably rinsed prior to refilling it with a granular softening agent and reintroduction into the female coupling element 51.

The water tanks 45 of FIGS. 5-7 and 8 are preferably made of a reasonably deformation-resistant material because they are intended for repeated use with the housing 39 of the respective steam iron. For example, such water tanks can be made of a suitable metallic or plastic sheet material.

The receptacle 55 preferably constitutes an inexpensive mass-produced article which can be discarded after each use if the operator does not wish to clean it prior to refilling with a fresh supply 56 of water softening agent. If the receptacle 55 is omitted, the bottom wall of the female coupling element 51 is perforated so that it performs the function of the bottom wall 59 of the receptacle 55 which is shown in FIG. 8 to thus ensure that the particles or granulae of softening agent cannot penetrate into the interior of the housing 39 where they would contaminate the steam chamber, the heating unit and/or other water-receiving components of the steam iron.

The steam iron which embodies the structure of FIG. 8 is preferably also provided with an observation facility, such as the window 32 shown in FIG. 6. To this end, at least a portion of the female coupling element 51 and at least a portion of the receptacle 55 will be made of a light-transmitting material so that the person in charge can observe, whenever desired, the color of the supply of softening agent in the receptacle.

Referring to FIG. 9, there is shown a portion of a fourth steam iron which comprises a dispensable (throw-away) water tank 61 replacing the reusable water tank 45 of FIGS. 5-7 or FIG. 8. The male coupling element 48 at the bottom of the water tank 61 defines a relatively large compartment 62 above an apertured bottom wall 63. The compartment 62 serves for reception of a brick- or block-shaped condensed or compacted supply 64 of water softening agent which is insertable into the water tank 61 upon detachment or mere lifting of the relatively large lid 69 at the top of the water tank 61. Thus, the upper side of the inserted block-shaped supply 64 of softening agent is in continuous contact with the body of water above it. The general direction in which the supply 64 is insertable into the tank 61 is indicated by an arrow B. The housing 39 of the steam iron which is shown in FIG. 9 comprises a female coupling element 51 which can receive the male coupling element 48 and has a bottom wall 53 provided with a central opening leading to the space 54 which, in turn, leads to the channel 38. The male coupling element 48 can be inserted in such a way that its bottom wall 63 is at least slightly spaced apart from the non-apertured bottom wall 53 of the female coupling element 51 so as to permit softened water to flow into the space 54 when the steam iron is in actual use. The valve or valves in the conduit or conduits 38 are not shown in the drawing. When the supply of softening agent 64 in the compartment 62 of the detachable throw-away water tank 61 is exhausted, the entire water tank is discarded or a fresh supply (block) of softening agent is introduced into the compartment 62 upon mere lifting or complete detachment of the lid 69. It is preferred to design the water tank 61 in such a way that it complements the adjacent portion of the housing 39 in order to enhance the appearance of the steam iron. For example, the tank 61 can constitute a plastic body which is mass-produced in a blow molding or another suitable plastic processing machine. It suffices to make a thin-walled water tank 61, especially if such tank is to be discarded after a single use. The opening which is normally sealed by the lid 69 of the tank 61 is sufficiently large to permit convenient introduction of a supply 64 of water softening agent into the compartment 62 as well as removal of such supply from the compartment 62 if and when necessary, i.e., if the water tank 61 is not to be discarded after a single use or after a small number of refillings. If desired, the rear end wall of the housing 39 can be provided with an observation facility which enables the user to observe the color of the supply 64 of softening agent in the compartment 62 of the male coupling element 48. To this end, at least a portion of the coupling element 48 will be made of a light-transmitting material. It is preferred to configurate the supply 64 of compacted softening agent in such a way that it fills or practically fills the compartment 62 when it is properly inserted into the male coupling element 48. This facilitates proper introduction of the supply 64 into the compartment 62 and prevents untreated (hard) water from bypassing the supply 64 on its way toward and through the bottom wall 63 of the male coupling element 48.

In order to reduce the cost of the tank 61, the lid 69 can be designed to be held in the opening in the top wall of the tank 61 simply by friction. In other words, it is not necessary to provide a threaded or any other expensive connection between the lid 69 and the major part of the tank 61. Friction between the exterior of the male coupling element 48 and the interior of the female coupling element 51 normally suffices to maintain the tank 61 in requisite position relative to the housing 39. However, if desired, the coupling element 48 can be provided with male detent means and the coupling element 51 can be provided with complementary female detent means (or vice versa) in order to establish a more reliable connection between the tank 61 and the housing 39.

Figure 10:
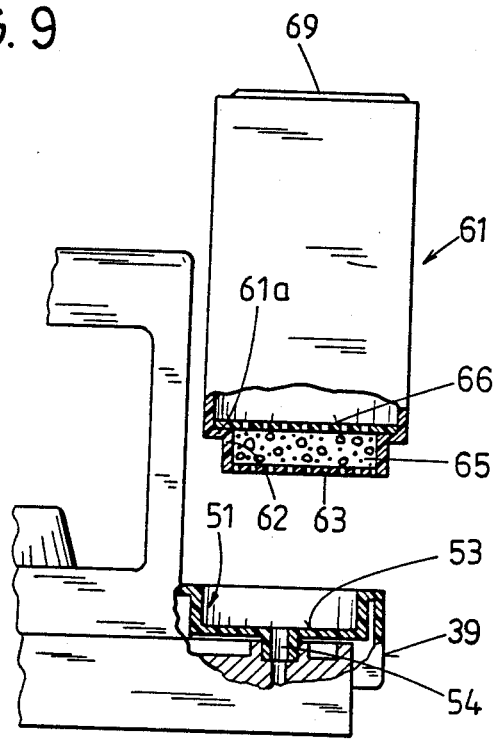
FIG. 10 is a similar fragmentary exploded partly sectional view of a further steam iron which employs a modified expendable water tank.

FIG. 10 shows a portion of a further steam iron which also employs a detachable and dispensable water tank 61. The compartment 62 in the male coupling element 48 at the bottom of the water tank 61 serves to receive a supply 65 of loose granular water softening agent which is confined between the apertured bottom wall 63 of the coupling element 48 and a sieve-like liquid-permeable pivotable or detachable closure or lid 66 resting on an internal shoulder 61a at the bottom of the tank 61. The closure 66 overlies the supply 65 so as to prevent floating of granular water softening agent in the body of water in the major portion of the tank 61. The closure 66 can be lifted or removed upon removal of the lid 69 at the top of the tank 61 so as to permit refilling of the supply 65 if such refilling is desired. Alternatively, the tank 61 and the closure 66 will be discarded when the condition of the supply 65 is changed, i.e., when the material in the compartment 62 is no longer performing its intended water-softening function. The housing 39 of the steam iron shown in FIG. 10 can be provided with an observation facility, and at least a portion of the male coupling element 48 of the tank 61 is then made of a light-transmitting material to permit an observation of the color of the supply 65 of softening agent in the compartment 62.

The closure 66 performs the additional desirable function of confining the supply 65 in the compartment 62 so as to ensure that any water which has penetrated through the apertures of the bottom wall 63 of the coupling element 48 was maintained in adequate contact with the softening agent prior to entering the opening 54 in the bottom wall 53 of the female coupling element 1 of the housing 39. The marginal portion of the closure 66 need not be provided with openings since it overlies the internal shoulder 61a of the tank 61. Instead of employing a fully extractible closure 66, it is also possible to provide a rudimentary hinge which pivotally connects the closure 66 to the tank 61. Such rudimentary hinge can simply constitute a thin film-like web between a marginal portion of the closure 66 and the adjacent portion of the tank 61. A hinge is desirable and advantageous if the tank 61 of FIG. 10 is intended for repeated use rather than for discarding after a single utilization.

An important advantage of the embodiments which are shown in FIGS. 9 and 10 is that it is not necessary to provide an envelope 50 and/or a receptacle 55 for the supply of water softening agent. Instead, the supply is introduced directly into the male coupling element 48 of the detachable water tank 61. Such design is often desirable because it contributes to lower cost of the steam iron and ensures a large-area contact between the body of water and the supply of softening agent.

If the water tank 61 of FIG. 9 or 10 is intended for a single use, it can be made of a very thin plastic material so as to further reduce the cost. A stabler (sturdier) water tank 61 will be employed if it is intended for repeated use and repeated refilling of its coupling element 48 with a supply 64 or 65 of water softening agent. The quality of material which is used to make the tank 61 also depends upon the number of uses to which such tank is to be put prior to discarding.

It goes without saying that the steam iron of FIG. 9 or 10 can be modified by employing a cartridge which is insertable into the male coupling element 48 in lieu of the supply 64 or 65. In addition, and if it is desired to further enhance the water softening action, a second cartridge containing a supply of water softening agent can be introduced into the female coupling element 51, for example, in a manner as shown in FIGS. 5-7 or in FIG. 8. Such solution will be resorted to if the tap water contains a high percentage of salts which are likely to form scale in the water receiving components of the steam iron.

The improved steam iron can be modified in a number of additional ways without departing from the spirit of the invention. For example, the configuration of the steam iron need not match or resemble that which is shown in FIG. 1 or 5. The invention can be embodied in all or practically all steam irons. Furthermore, the configuration of cartridges or envelopes for supplies of softening agent can be varied in a number of ways. The same holds true for the configuration and dimensions of the receptacle 34, the configuration and dimensions of the compartment 62, and the configuration and dimensions of the receptacle 55. If compacted supplies of water softening agent are employed, care should be taken to ensure that the compacted supplies permit water to flow therethrough at the required rate on their way toward the water receiving components of the steam iron.

As mentioned above, a steam iron constitutes but one of the water-consuming appliances which can be equipped with the novel water softening means. It is equally possible to employ such water softening means in other types of appliances, particularly in coffee makers and in tea making machines.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In an electric appliance, such as a steam iron with a work-piece smoothing surface, the combination of a housing contained in said appliance; a vessel provided in said housing and arranged to store a body of water, such as magnesium- and/or calcium-containing tap water; means for receiving water from said vessel, said receiving means being provided in said housing and extending to said smoothing surface; means defining at least one path for the flow of water in said housing from said vessel to said receiving means; and a supply of water softening agent in said path.

2. The structure of claim 1, further comprising in said housing an observation facility for the supply of softening agent in said path.

3. The structure of claim 2, wherein the composition of said agent is such that at least one of its characteristics, particularly its color, changes when its water softening capacity is reduced or exhausted, said facility being arranged to permit visual determination of said one characteristic.

4. The structure of claim 1, wherein said smoothing surface is provided on an apertured sole plate, said receiving means including means for heating water to the boiling point with attendant generation of steam, and a steam chamber arranged to admit steam to the apertures of said sole plate.

5. The structure of claim 1, wherein said path defining means includes at least one water outlet provided in said vessel and a receptacle arranged to confine the supply of softening agent and receiving water from said outlet.

6. The structure of claim 5, wherein said receiving means comprises a steam chamber and said receptacle has a liquid-permeable portion through which water passes on its way into said chamber subsequent to penetration of water through the supply of softening agent in said housing.

7. The structure of claim 6, wherein said outlet is disposed at a level above said receptacle and said receptacle has a bottom wall disposed beneath the supply of softening agent and including said liquid-permeable portion.

8. The structure of claim 5, further comprising an observation facility for the supply of softening agent in said receptacle, said receptacle having a light-transmitting portion between said supply and said facility.

9. The structure of claim 1, wherein said receiving means comprises a water metering device.

10. The structure of claim 9, wherein said metering device includes a pump.

11. The structure of claim 9, wherein said metering device comprises a valve.

12. The structure of claim 9, wherein said receiving means further comprises a steam chamber which receives water from said metering device.

13. The structure of claim 1, further comprising a housing, said path defining means including a first coupling element provided on said vessel and said housing having a second coupling element separably connected with said first coupling element so that said vessel can be detached from and reattached to said housing.

14. The structure of claim 13, wherein said first coupling element includes an outlet for water which is confined in said vessel.

15. The structure of claim 1, further comprising a housing, said vessel constituting a dispensable tank which is separably coupled to said housing.

16. The structure of claim 1, further comprising a cartridge for the supply of softening agent.

17. The structure of claim 16, wherein said cartridge is refillable with softening agent.

18. In an electric appliance, such as a steam iron, the combination of a vessel arranged to store a body of water, such as magnesium- and/or calcium-containing tap water; means for receiving water from said vessel; means defining at least one path for the flow of water from said vessel to said receiving means; a supply of water softening agent in said path, said path defining means including at least one water outlet provided in said vessel and a receptacle arranged to confine the supply of softening agent and receiving water from said outlet; an observation facility for the supply of softening agent in said receptacle, said receptacle having a light-transmitting portion between said supply and said facility; a housing for said path defining means; and a support for said receptacle, said support being movably mounted in said housing and said observation facility being provided on said support.

19. The structure of claim 18, wherein said housing includes an end wall and said support is movably mounted in said end wall, said observation facility being disposed externally of said housing.

20. The structure of claim 19, wherein said support is elongated, said receptacle being provided at one end and said observation facility being provided at the other end of said support.

21. The structure of claim 19, wherein said end wall has an opening for said support and guide means adjacent said opening, said support being reciprocable along said guide means.

22. The structure of claim 21, wherein said support and said housing have cooperating detent means for releasably holding the support in at least one predetermined position with reference to said end wall.

23. In an electric appliance, such as a steam iron, the combination of a vessel arranged to store a body of water, such as magnesium- and/or calcium-containing tap water; means for receiving water from said vessel; means defining at least one path for the flow of water from said vessel to said receiving means, including a first coupling element provided on said vessel and including an outlet for water which is confined in said vessel and a supply of water softening agent in said path; and a housing having a second coupling element separably connected with said first coupling element so that said vessel can be detached from and reattached to said housing, said second coupling element defining a chamber for the supply of softening agent.

24. The structure of claim 23, further comprising a puncturable envelope for the supply of softening agent, at least one of said coupling elements having means for puncturing said envelope in response to attachment of said vessel to said housing.

25. The structure of claim 24, wherein said puncturing means includes a plurality of puncturing elements provided on said at least one coupling element to establish in said envelope a plurality of openings for penetration of water into contact with the supply of softening agent.

26. The structure of claim 23, further comprising a refillable receptacle for the supply of softening agent in said chamber.

27. The structure of claim 26, wherein said receptacle is insertable into and withdrawable from said chamber.

28. The structure of claim 27, wherein said receptacle has an open top in line with said outlet and a rim surrounding said open top, said second coupling element having a recess which receives said rim in response to insertion of said receptacle into said chamber.

29. In an electric appliance, such as a steam iron, the combination of a vessel arranged to store a body of water, such as magnesium- and/or calcium-containing tap water; means for receiving water from said vessel; means defining at least one path for the flow of water from said vessel to said receiving means; a supply of softening agent in said path, said path defining means including a first coupling element provided on said vessel and including an outlet for water which is confined in said vessel, said first coupling element having a compartment in the interior of said vessel and said supply of softening agent being disposed in said compartment so that it is in contact with the body of water in said vessel; and a housing having a second coupling element separably connected with said first coupling element so that said vessel can be detached from and reattached to said housing.

30. The structure of claim 29, wherein said first coupling element is insertable into said second coupling element and is arranged to be held therein by friction.

31. The structure of claim 29, wherein said supply consists of compacted softening agent and has a shape such as to substantially fill said compartment.

32. The structure of claim 31, wherein said first coupling element has a bottom wall which is disposed beneath said compartment and has at least one aperture constituting or forming part of said outlet.

33. The structure of claim 29, wherein the supply of softening agent in said compartment is in a granular or pulverulent state, and further comprising a liquid-permeable lid overlying the supply of softening agent in said compartment.

34. The structure of claim 33, wherein said lid includes a sieve.

35. In an electric appliance, such as a steam iron, the combination of a vessel arranged to store a body of water, such as magnesium- and/or calcium-containing tap water; means for receiving water from said vessel; means defining at least one path for the flow of water from said vessel to said receiving means; a supply of water softening agent in said path; and a housing, said vessel constituting as dispensable tank which is separably coupled to said housing, said tank having a sieve-like portion and said supply of softening agent being disposed in said tank adjacent said sieve-like portion.

* * * * *

REEXAMINATION CERTIFICATE (1651st)
United States Patent [19]
Mahlich et al.

[11] B1 4,893,422
[45] Certificate Issued    Mar. 3, 1992

[54] STEAM IRON WITH WATER SOFTENING FACILITY

[75] Inventors: Gotthard C. Mahlich, Kronberg; Michael Borgmann, Solingen, both of Fed. Rep. of Germany

[73] Assignee: Robert Krups Stiftung & Co. KG., Fed. Rep. of Germany

Reexamination Request:
   No. 90/002,219, Dec. 6, 1990
   No. 90/002,299, Mar. 15, 1991

Reexamination Certificate for:
   Patent No.: 4,893,422
   Issued: Jan. 16, 1990
   Appl. No.: 239,211
   Filed: Aug. 31, 1988

[30] Foreign Application Priority Data

Sep. 5, 1987 [DE] Fed. Rep. of Germany ....... 3729800

[51] Int. Cl.$^5$ .............................................. D06F 75/14
[52] U.S. Cl. .................................. 38/77.3; 38/77.83; 38/77.8; 210/94; 210/251; 210/282
[58] Field of Search .................... 38/77.83, 77.6, 77.3, 38/77.8, 77.2; 68/13 A; 210/282, 94, 251

[56] References Cited

U.S. PATENT DOCUMENTS

| | | |
|---|---|---|
| 3,788,484 | 1/1974 | Godin . |
| 3,949,499 | 4/1976 | Schaeffer et al. . |
| 4,400,279 | 8/1983 | Wahl et al. . |
| 4,416,775 | 11/1983 | Halbich et al. . |
| 4,484,399 | 11/1984 | Bianculani ...................... 38/77.8 X |
| 4,565,019 | 1/1986 | Cavalli .......................... 38/77.6 |

FOREIGN PATENT DOCUMENTS

| | | |
|---|---|---|
| 2242402 | 3/1974 | Fed. Rep. of Germany . |
| 3014493 | 10/1981 | Fed. Rep. of Germany . |
| 3033964 | 1/1982 | Fed. Rep. of Germany . |
| 3204796 | 9/1982 | Fed. Rep. of Germany . |
| 9000917 | 3/1990 | Fed. Rep. of Germany . |
| 160997 | 8/1985 | Japan . |
| 1014399 | 12/1965 | United Kingdom .................... 38/90 |
| 1022697 | 3/1966 | United Kingdom . |

Primary Examiner—Andrew M. Falik

[57] ABSTRACT

An electric steam iron wherein the path for the flow of water from a premanently installed or detachable water tank to the heater contains a supply of water softening agent which can be observed from the exterior of the housing and can be replaced, when necessary, or discarded jointly with an expandible tank or with a perforable envelope or an apertured cartridge.

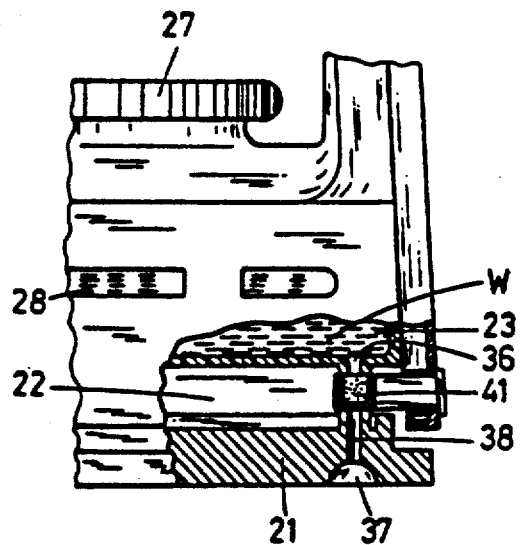

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 49–64:

The invention is embodied in an electric appliance, such as a steam iron[, a coffee maker or a tea making machine]. The appliance comprises a vessel which serves to store a body of water, such as magnesium- and/or calcium-containing tap water, means for receiving water from the vessel [such receiving means can include a steam chamber or a filter holder for tea leaves [of] *or* comminuted coffee beans), means defining at least one path for the flow of water from the vessel to the receiving means, and a supply of [declacifying] *decalcifying* or softening agent in such path. The term ["declacifying] *"decalcifying* or softening agent" is intended to embrace all types of substances which are used to soften water by removing scale-forming calcium and/or magnesium ions from hard water or replacing them by the more soluble ions, such as sodium ions.

Column 4, lines 23–24:

FIG. 4 is a view as seen in the direction of [arrow] *arrows from the line* IV—IV in FIG. 3;

Column 5, line 64–68 to Column 6, line 1–38:

The support 31 is reciprocable in an opening 30 which is provided therefor in the rear end wall 29 of the housing 39. The outer end portion of the support 31 carries an observation facility in the form of a window 32. The window 32 permits observation of the color and/or other characteristics of the supply 41 of water softening agent in the compartment 33 of the receptacle 34 at the inner end of the support 31. The portion 34a of the receptacle 34 transmits light so that a person looking through the window 32 can see the color of the supply 41 of softening agent in the compartment 33. Certain softening agents which can be utilized in the steam iron 20 of FIGS. 1 to 4 are of such composition that their color changes when their water softening action decreases so that, by observing the color of the softening agent in the compartment 33, the operator can ascertain whether or not the supply 41 is still capable of performing its water softening function. If not, the support 31 is simply withdrawn from the opening 30 in the rear end wall 29 of the housing 39, the supply 41 of softening agent is expelled from the compartment 33, and such compartment is filled with a fresh supply 41 of softening agent prior to reinsertion of the support 31 into the opening 30 of the rear end wall 29. The rear end wall 29 is provided with guide means 43 which flank the opening 30 and cooperate with complementary follower means 42 on the support 31 to ensure that the support is properly guided during movement relative to the housing 39. FIGS. 2–4 show the support in one of its positions, namely in that predetermined position in which the receptacle 34 is located in the aforementioned path for the flow of water W from the outlet 36 of the vessel 23 into the water receiving means of the steam iron 20. The bottom wall 35 of the receptacle 34 constitutes a water-permeable portion which permits water W to flow through the supply of [softeninq] *softening* agent toward and into the water receiving means of the steam iron 20. For example, the bottom wall 35 can constitute a conventional sieve or filter with interstices which are small enough to retain the supply 41 of softening agent but permit water to flow therethrough toward and ultimately into the steam chamber 22 prior to entering the apertures 37 of the sole plate 21.

AS A RESULT OF REEXAMINATION, IT HAS BEEN DETERMINED THAT:

Claims 5, 16, 29–34 and 35 are cancelled.

Claims 1, 2, 6–8, 13–15, 17, 18, 23, 26, 27 and 28 are determined to be patentable as amended.

Claims 3, 4, 9–12, 19–22, 24 and 25, dependent on an amended claim, are determined to be patentable.

1. In an electric appliance] *iron*, such as a steam iron with a work-piece smoothing surface, the combination of a housing contained in said [appliance] *iron;* a vessel provided in said housing and arranged to store a body of water, such as magnesium- and/or calcium-containing tap water; *said vessel having at least one water-admitting inlet and at least one water-discharging outlet;* means for receiving water from said vessel, said receiving means being provided in said housing and extending to said smoothing surface; means defining at least one path for the flow of water *fixedly arranged* in said housing from said *at least one outlet of said* vessel to said receiving means; and a *receptacle for a* supply of water softening agent in said path, *said receptacle being located in and being removable from said path and having at least one water-admitting inlet and at least one outlet for treated water.*

6. The structure of claim [5] *1*, wherein said receiving means comprises a steam chamber and said receptacle has a liquid-permeable portion *which is provided with said at least one outlet of said receptacle and* through which water passes on its way into said chamber subsequent to penetration of water through the supply of softening agent in said [housing] *receptacle*.

7. The structure of claim 6, wherein said *at least one* outlet *of said vessel* is disposed at a level above said receptacle and said receptacle has a bottom wall disposed beneath the supply of softening agent and including said liquid-permeable portion.

8. The structure of claim [5] *1*, further comprising an observation facility for the supply of softening agent in said receptacle, said receptacle having a light-transmitting portion between said supply and said facility.

13. The structure of claim 1, [further comprising a housing,] *wherein* said path-defining means [including] *includes* a first coupling element provided on said vessel and said housing [having] *has* a second coupling element separably connected with said first coupling element so that said vessel can be detached from and reattached to said housing.

14. The structure of claim 13, wherein said first coupling element includes [an] *said at least one water-discharging* outlet [for water which is confined in] *of* said vessel.

17. The structure of claim [16] *1*, wherein said [cartridge is refillable with] *receptacle includes means for permitting addition of the* softening agent.

18. In [an electric appliance] *a portable iron*, such as a steam iron, the combination of a vessel arranged to store a body of water, such as magnesium- and/or calcium-containing tap water, *said vessel having at least one water-admitting inlet and at least one water-discharging outlet; a sole plate associated with said vessel for joint movement therewith when the iron is in use;* means for receiving water from said vessel; means defining at least one path for the flow of water from *said at least one water-discharging outlet of* said vessel to said receiving means; a supply of water softening agent in said path, said path defining means including *a receptacle arranged to confine the supply of softening agent and receiving water from the* at least one [water] outlet [provided in] *of* said vessel [and a receptacle arranged to confine the supply of softening agent and receiving water from said outlet]; [an observation] *a* facility for *observation of* the supply of softening agent in said receptacle *while said receiving means receives water from said vessel*, said receptacle having a light-transmitting portion between said supply and said facility; a housing for said path defining means; and a support for said receptacle, said support being movably mounted in said housing and said observation facility being provided in said support.

23. In an [electric appliance] *iron*, such as a steam iron, the combination of a vessel arranged to store a body of water, such as magnesium- and/or calcium-containing tap water, *said vessel having at least one water-admitting inlet and at least one water-discharging outlet;* means for receiving water from said vessel; means defining at least one path for the flow of water from *the at least one outlet of* said vessel to said receiving means, including a first coupling element provided on said vessel including [an] *the at least one* outlet [for water which is confined in] *of* said vessel; *a receptacle for* [and] a supply of [water] softening agent in said path; [and] a housing having a second coupling element separably connected with said first coupling element so that said vessel can be detached from and reattached to said housing, said second coupling element defining a chamber for [the supply] *said receptacle; and means for facilitating observation of softening agent in said receptacle while said vessel is attached to said housing.*

26. The structure of claim 23, [further comprising a refillable receptacle for the supply of softening agent in said chamber] *wherein said receptacle includes means for permitting addition of the softening agent.*

27. The structure of claim 26, wherein said receptacle is insertable into and withdrawable from said chamber *through an opening of said second coupling element.*

28. The structure of claim 27, wherein said receptacle has an open top in line with [said] *the at least one water-discharging* outlet *of said vessel* and a rim surrounding said open top, said second coupling element having a recess which receives said rim in response to insertion of said receptacle into said chamber.

* * * * *